(12) United States Patent
Friedman (10) Patent No.: US 7,519,911 B2
(45) Date of Patent: Apr. 14, 2009

(54) SYSTEMS AND METHODS FOR MANAGING AND AGGREGATING MEDIA FORMATS

(75) Inventor: Lee Friedman, Alpharetta, GA (US)

(73) Assignee: AT&T Intellectual Property II, L.P., New York, NY (US)

( * ) Notice: Subject to any disclaimer, the term of this patent is extended or adjusted under 35 U.S.C. 154(b) by 313 days.

(21) Appl. No.: 10/038,944

(22) Filed: Dec. 31, 2001

(65) Prior Publication Data

US 2004/0148362 A1 Jul. 29, 2004

Related U.S. Application Data

(60) Provisional application No. 60/336,328, filed on Nov. 2, 2001.

(51) Int. Cl.
*G06F 3/00* (2006.01)
(52) U.S. Cl. .................. 715/752; 715/716; 715/717; 715/744; 715/745
(58) Field of Classification Search .............. 345/716, 345/717, 744, 745
See application file for complete search history.

(56) References Cited

U.S. PATENT DOCUMENTS

| | | | | |
|---|---|---|---|---|
| 5,732,275 | A * | 3/1998 | Kullick et al. ............... | 717/170 |
| 6,055,566 | A | 4/2000 | Kikinis | |
| 6,151,643 | A * | 11/2000 | Cheng et al. .................. | 710/36 |
| 6,248,946 | B1 | 6/2001 | Dwek | |
| 6,262,724 | B1 | 7/2001 | Crow et al. | |
| 6,314,565 | B1 * | 11/2001 | Kenner et al. ............... | 717/171 |
| 6,452,609 | B1 | 9/2002 | Katinsky et al. ............ | 345/716 |
| 6,678,888 | B1 * | 1/2004 | Sakanishi .................... | 717/172 |
| 6,707,459 | B1 * | 3/2004 | Graves et al. ................ | 345/604 |
| 2002/0067907 | A1 * | 6/2002 | Ameres ....................... | 386/46 |
| 2002/0082730 | A1 * | 6/2002 | Capps et al. .................. | 700/94 |
| 2002/0089529 | A1 | 7/2002 | Robbin ....................... | 345/716 |
| 2002/0091764 | A1 * | 7/2002 | Yale ........................... | 709/203 |
| 2002/0095615 | A1 * | 7/2002 | Hastings et al. ................ | 714/4 |
| 2002/0143795 | A1 * | 10/2002 | Fletcher et al. ............. | 707/200 |
| 2003/0033449 | A1 * | 2/2003 | Frantz et al. .................... | 710/1 |

OTHER PUBLICATIONS

Windows Media Player 7, Microsoft Corp., Mar. 27, 2000.*
Menezes et al. Handbook of Applied Cryptography, 1997, CRC Press, p. 26.*

* cited by examiner

*Primary Examiner*—Stephen S Hong
*Assistant Examiner*—Ryan F Pitaro (57) ABSTRACT

Systems and methods remotely aggregate codecs, media player standards, or other media format access data such that a media player resident on a client device can access the content of media files of virtually any media format through a single universal media player having a graphical user interface. Thus, the user need not utilize multiple media players or manually associate of media file types with the appropriate media player. The most recent versions of media formats are maintained remotely such that updates are provided via a network interface between the client device and the remote server. Program modules that generate the universal media player are also remotely managed by the remote server such that the application is continually updated. Whenever a user encounters a media file of a previously unencountered or unsupported media file type, the universal media player retrieves the appropriate media format access data to access the file.

80 Claims, 5 Drawing Sheets

SYSTEMS AND METHODS FOR MANAGING AND AGGREGATING MEDIA FORMATS

RELATED APPLICATION

This application claims priority to and incorporates by reference, U.S. Provisional Application Ser. No. 60/336,328 entitled "Systems and Methods For Managing and Aggregating Media Formats," filed on Nov. 2, 2001.

FIELD OF THE INVENTION

The invention relates to systems and methods for managing and aggregating media formats, and more particularly, to systems and methods that deliver functionality of many different media players via a single interface.

BACKGROUND

While navigating in a desktop computing and/or Internet environment, a user may encounter any of over a hundred different types of media files. A media file is a data structure that comprises audio, video, image, and/or other data. The format of a media file is usually evidenced by its file extension, which is the two or three-character code preceded by a dot (.) that indicates the type of file, such as the format in which the file was created. A file of a particular media format usually corresponds to a fixed set of one or more commercial software applications, commonly referred to as "media players," that can properly play its data, image, sound, and/or video content. The audio, video, image, and/or other data content that comprises a media file is compressed for storage. To access the content of a media file of a particular media format, a compressor/decompressor standard commonly called a "codec" is required. Examples of video codecs include MPEG, Indeo and Cinepak. Thus, for every existing media format, there is at least one associated codec.

A generic software application that can access the content of a media file of a specific format will hereinafter be referred to as a "media player." Examples of media players include RealPlayer, Macromedia Shockwave Player, Windows Media Player, and MusicMatch Jukebox Plus. Table 1 provides examples of media formats and associated media players.

TABLE 1

| Media Format | Description | Compatible Media Player |
| --- | --- | --- |
| .mp3 | Audio | Audio player |
| .mov | Audio &video | Quicktime player |
| .swf | Audio &video | Flash Player |
| .tif(f) | Image | Image viewer |
| .mid | Audio | Midi player |
| .mpg | Audio &video | Mpeg player |
| .snd | Audio | Audio player |
| .bmp | Picture (Bitmap) | Picture viewer |
| .wav | Audio | Audio player |

Because of the incompatibility between certain media players and media formats, the user must either know which media formats can be accessed by which media player, or must configure the computer to associate formats with compatible media players. For example, if a user encounters a media file while browsing the Internet, the user can manually activate a compatible media player that is stored on the computer's hard drive, and use its controls to access the content of the file. In the alternative, in an environment such as Windows NT, a user can associate specific media file types with compatible media players that are stored on the user's hard drive. A disadvantage of either approach is that the user typically is required to acquire, install, operate and maintain the latest versions of multiple media players.

SUMMARY

This invention addresses the problems above by providing systems and methods that can subsume or supplant all commercially available media players. The systems according to the invention manages the acquisition, installation, operation, and maintenance of various codecs and/or media player standards via a single interface, hereinafter referred to as a "universal media player." The universal media player can subsume other media players on multiple levels, including at the media player level, at the codec level, as well as at the media format (file type) level.

In one aspect of this invention, the universal media player can be downloaded or otherwise installed on a user's personal computer. The universal media player provides a user-friendly interface into which the functionality necessary to access multiple media formats is aggregated, such that the universal media player enables the user to access the content of any supported media file type. This aggregation of media player standards and/or codecs into a universal media player eliminates the need for the user to acquire and maintain up-to-date versions of different media player applications. The user also has only to learn to use the universal media player, rather than multiple media player applications.

In another aspect of the invention, the universal media player maintains a roster of media formats which are accessible using the universal media player. The universal media player provides version control of media format access data such as codecs and/or media player standards that are needed to access each media format on the roster, by automatically procuring new and updated versions thereof. Procurement of new and updated media format access can occur in response to several occurrences. Preferably, when the user encounters a media file with a new or previously unencountered media format, the universal media player becomes in communication with a remote server, which provides the media format access data needed to access the content of the media file.

The systems and methods of the inventions can be made available to users on a subscription basis. For example, the provider of the universal media player can be an Internet Service Provider (ISP) and the user can be a customer of the ISP. Thus, the provider can easily access the user's computer via standard communications protocols such as dial-up or network Internet sessions, thereby enabling the provider to continually aggregate and manage media player standards and/or codecs for the user.

In summary, the systems and methods provide a seamless interface for users to access the content of media files created in various different media formats. In addition, the systems and methods provide an automatic process of acquiring, installing and updating versions of the interface itself, as well as media standards and codecs. Updated versions of program modules, media player standards, and codecs are delivered to a user device via at least one server. A user interface can be personalized to accommodate the preferences of the user.

Other advantages and features of the invention will be apparent from the description below, and from the accompanying papers forming this application.

BRIEF DESCRIPTION OF DRAWINGS

The accompanying drawings, which are incorporated in and form a part of the specification, illustrate preferred embodiments of the present invention and, together with the description, disclose the principles of the invention. In the drawings.

DETAILED DESCRIPTION

Systems and methods according to a preferred embodiment of the invention offer a universal media player to a user device. The user device can be any type of device, including but not limited to digital televisions, enhanced televisions, WebTV, any other type of interactive television, desk-top computers, lap-top computers, Palm Pilot, PocketPC, Visor, any other type of Personal Digital Assistants, Internet appliances, data devices, mobile radiotelephones, interactive pagers, or any other type of communication device. The user device supports storage and retrieval of media content and other data of multiple formats.

The media content can be in any type of media file and can comprise data, audio, video, graphics, animated graphics, any combination of these formats, or any other type of media format. For example, these media file types include, but are not limited, to the media formats listed above in Table 1. To access a file of any commercially available media format, the system according to the invention must maintain an operable version the appropriate media format access data, which is for example, a decompression/compression file known as a codec or a media player standard that contains a set of codecs. The user device can receive the media file in a number of ways. For instance, the user device can receive media files through a network, such as the Internet, wireless networks, local area network (LAN), wide area network (WAN), or cable networks, or can receive media files through a storage medium, such as a floppy disk, CD-ROM, DVD, or other magnetic or optical storage media.

A media format system 10 maintains media format access data, such as codecs 12, media format access data 14, and media player standards 16. The media format access data is usable to support access to a set of remote media formats. The set of remote media formats is to be interpreted as open-ended, to include proprietary and open standard commercially available media formats, such that new media formats are added thereto as those media formats are developed in the industry, and the media format system 10 obtains an operable version of media format access data that can enable access to the content of each new media format. The media format system 10 can be available to the user device 5 through a network 20, such as the Internet. The media format system 10 can comprise any suitable type of system and preferably comprises a server which functions as a media format site (MFS) on the Internet 20. The MFS 10 transmits data and program modules to the user device 5 and the user device 5 has an interface 7 that provides a user interface to the data and program modules.

I. Exemplary Environment

Figure 1:
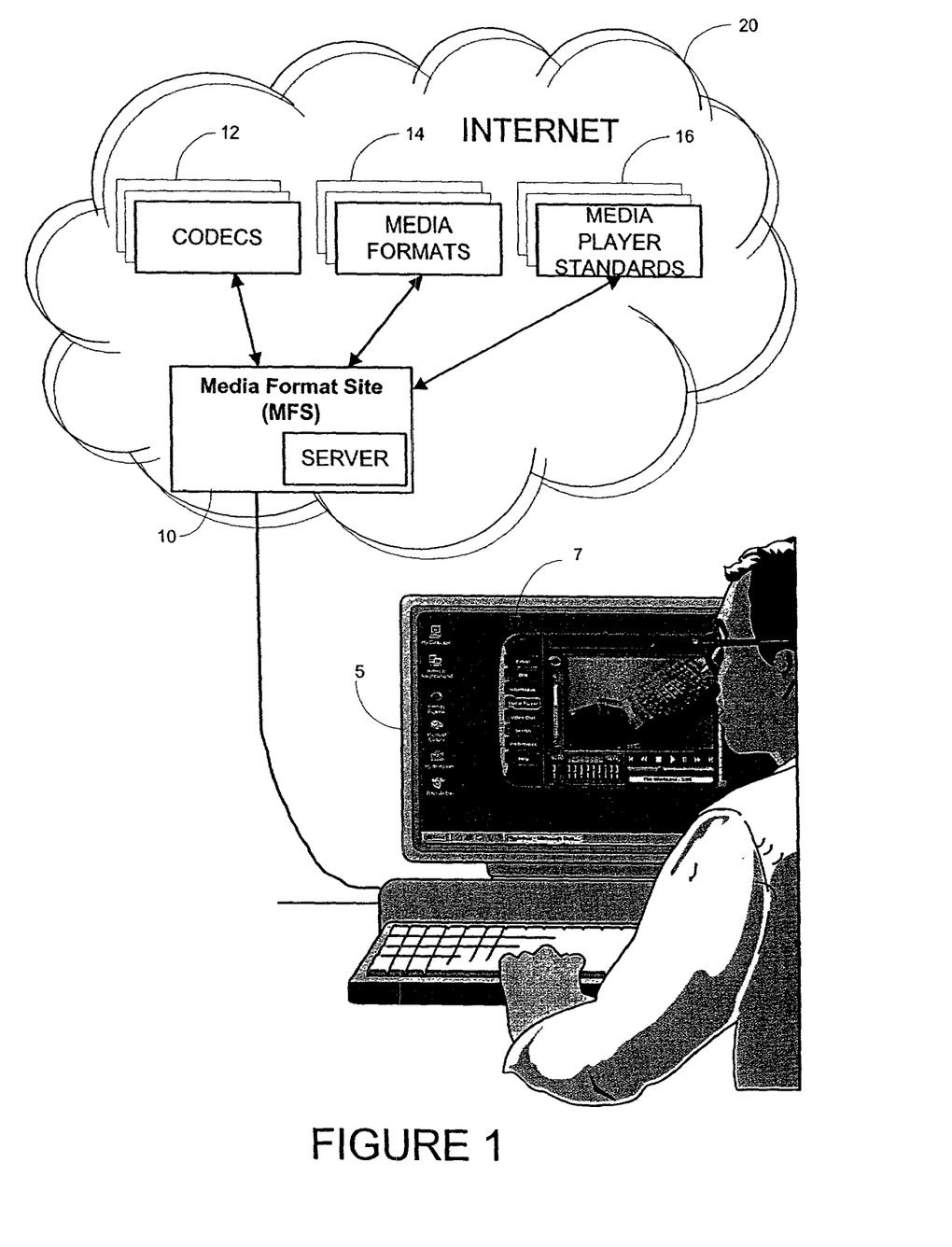
FIG. 1 is a diagram of a network according to one embodiment of the invention.

As mentioned above, the systems and methods of the invention can be used with a variety of user devices 5. For the purposes of this description, the user device 5 will be described as a personal computer (PC) 5. As shown in FIG. 1, a user accesses the MFS 10 via the PC 5 and through the interface 7 provided by the PC 5. The PC 5 can be connected to the Internet 20 as shown or to another network, such as through a dial-up modem connection, LAN, digital subscriber line, or other communications connection. The user activates and controls the PC 5 through any available type of input and/or output devices, such as a standard PC screen, keyboard, voice-activated unit, mouse, stylus, touch screen, or other typical input/output devices. Of course, the precise type of input and/or output device and the interface 7 will vary with the type of user device 5.

Figure 2:
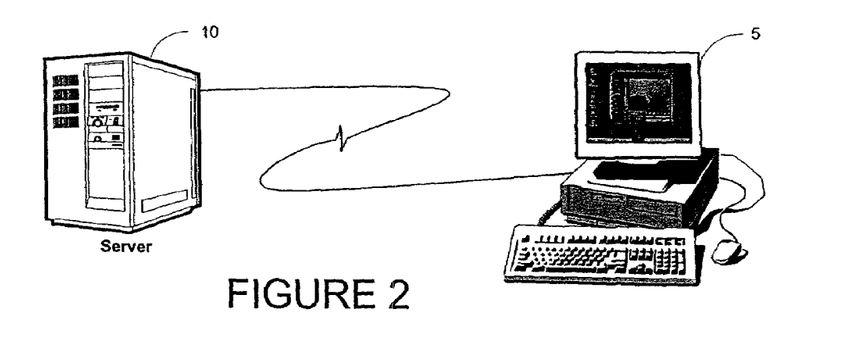
FIG. 2 is a simplified network diagram of a user device and system according to the invention.

A simplified diagram of a network according to the invention is illustrated in FIG. 2. The network is implemented as applications that work in connection with operating systems of computers in a client-server environment. Other implementations are possible. For example, implementations can include programs, modules, routines, components, data structures, and other elements that execute tasks or implement data types. The network can be used or implemented with other computers, other computer system configurations, including hand-held units, multiprocessors systems, microprocessor systems, minicomputers, mainframe computers, and the like. The network also can be practiced in a distributed or peer-to-peer computing environment where tasks can be performed by remote processing devices linked through a communications network. In a distributed environment, programs, modules, or program modules can be located in both local and remote memory storage devices.

Figure 3:
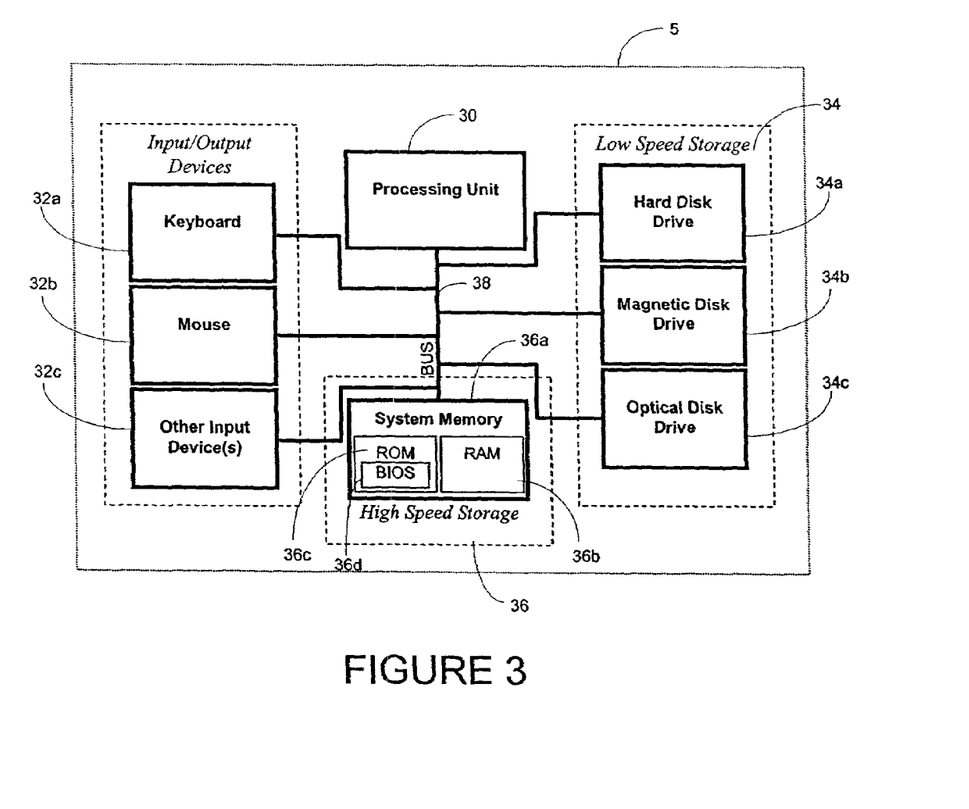
FIG. 3 is a block diagram of a user device according to one aspect of the invention.

FIG. 3 is an exemplary system diagram of the PC 5. The PC 5 includes a processing unit 30, high speed storage 36 such as system memory 36a, and a system bus 38 that couples the system memory 36a to the processing unit 30. The system memory 36a includes read only memory (ROM) 36c and random access memory (RAM) 36b. A basic input/output system (BIOS) 36d, containing the basic routines that help to transfer information between elements within the PC 5, such as during start-up, is stored in ROM 36c. The PC 5 further includes low speed storage 34, such as a hard disk drive 34a, a magnetic disk drive 34b, e.g., to read from or write to a removable disk, and an optical disk drive 34c, e.g., for reading a CD-ROM disk or to read from or write to other optical media. The hard disk drive 34a, magnetic disk drive 34b, and optical disk drive 34c include a hard disk drive interface, a magnetic disk drive interface, and an optical drive interface, respectively, for coupling each of the drives 34 to the bus 38. The drives 34 and their associated computer-readable media provide nonvolatile storage for the PC 5. Although the description of computer-readable medium above refers to a hard disk, a removable magnetic disk and a CD-ROM disk, other types or media readable by a PC 5, such as magnetic cassettes, flash memory cards, digital video disks, Bernoulli™ cartridges, and the like, can also be used.

A number of program modules can be stored in the drives and RAM, including an operating system, one or more application programs, a shared code library, and a property browser program module. A user can enter commands and information into the PC 5 through a keyboard 32a and pointing device 32b, such as a mouse. Other input/output devices 32c can include a microphone, joystick, game pad, satellite dish, scanner, or the like. These and other input devices are often connected to the processing unit 30 through a serial port interface coupled to the system bus 38, but can be connected by other interfaces, such as game port or a universal serial bus (USB). A monitor or other type of display device is included in the other input/output devices 32c and is also connected to the system bus 38 via an interface, such as a video adapter. In addition to the monitor, PCs 5 typically include other peripheral output devices as part of the input/output devices 32c, such as speakers or printers.

Referring again to FIG. 2, the PC 5 can operate in a networked environment using logical connections to the media format system 10, which can comprise one or more remote computers. The media format system 10 can be a server, a router, a peer device or other common network node, and typically includes many or all of the elements described relative to the PC 5, although only a memory storage device has been illustrated in FIG. 2. The memory storage device of the system 10 can include stored program modules for execution by the system 10. The communications link depicted in FIG. 2 includes a local area network (LAN) and a wide area network (WAN). Such networking environments are commonplace in offices, enterprise-wise computer networks, intranets and the Internet.

When used in a LAN networking environment, the PC 5 is linked to the LAN through a network interface. When used in a WAN networking environment, the PC 5 typically includes a modem or other means for establishing communications over the WAN, such as the Internet. The modem, which can be internal or external, is connected to the system bus 38 via the serial port interface. In a networked environment, program modules depicted relative to the PC 5, or portions thereof, can be stored in the remote memory storage device. The network connections are exemplary and other means of establishing a communications link between a user device 5 and system 10 can be used.

Referring again to FIG. 2, the logical connections, LAN and WAN, can be supported by different hardware configurations. For example, the underlying hardware for the network connections can be a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital network) line, a dial-up port such as a V.90, V.34 or V.24 bis analog modem connection, a cable modem, an ATM (Asynchronous Transfer Mode) connection, or FDDI (Fiber Distributed Data Interface) or CDDI (Copper Distributed Data Interface) connections.

II. Network Connection

The universal media player on the PC 5 having the user interface 7 preferably is in regular communication with the system 10 through a network. The communication generally takes place over one or more communications channels. The bandwidth of the communications channel typically impacts the speed of communication between the universal media player and the network. The higher the bandwidth of a communications channel, the higher the amount of data that can be transferred through the communications channel. By way of example, when the universal media player and the PC 5 connect to the system 10 through a high-speed connection, such as a DSL connection, the universal media player and PC 5 can quickly identify, evaluate, install or update a media format. On the other hand, if the universal media player and PC 5 are connected to the system 10 via a low-speed modem, downloads and data transmissions to the universal media player and PC 5 will be slower.

III. Media Format System

In an exemplary embodiment, the universal media player on the PC 5 communicates with the system 10 via a client-server environment. The system 10 is therefore a server-side component and stores data such as media formats, codecs, media player standards, and program modules on at least one server. As mentioned above, the system 10 comprises any type of remote information source such as the MFS, which can be a site on the Internet, possibly hosted by an Internet service provider (ISP). The MFS 10 furthermore can be an Application Service Provider (ASP) separate from the ISP. The MFS 10 has several functional components, including data management and data storage. As will be explained in more detail below, the MFS 10 can also control media format and program module updating and personalization.

The data management component of the MFS 10 controls billing and encryption of data transfers between the user devices 5 and the MFS 10, where the data transferred can include media formats, media player standards, and program modules. For example, with regard to billing functionality, the MFS 10 transfers credit card information or other identifying data that is used to collect payment for transfers to the user devices 5 and for other services rendered by the MFS 10. The MFS 10 provides encryption to protect these transfers and other data transfers from being intercepted by unauthorized entities.

The MFS 10 also provides the function of data storage. The MFS 10 stores the data in a database. The database contains up-to-date media player standards, along with associated codecs. As one example, each media player standard can be cross-referenced with at least one media file type, one or more associated codecs, and possibly several analogous commercial media players. For example, hypothetical media player standard XPlayer can access media content with the file extensions .movie, .sound, and .video, using codecs x, y, and z, and is analogous to CommercialPlayerA and CommercialPlayerB. A particular codec can be shared by more than one media format. The MFS 10 also stores up-to-date program modules, which are typically software components of the universal media player. The MFS 10 database can also store media content, including test files and other media files.

The MFS 10 can include a network server that controls communication with the user device 5 to effect updates to lists of supported media formats, media player standards, codecs, and program modules. In one embodiment, the MFS 10 obtains new and updated formats as the server periodically or continually scans predetermined network sites that are accessible sources of media player standards, codecs, and media formats. When the server encounters a network site that contains a media players standard or codec that is a newer version than the version resident on the MFS 10, or a new media format that has been targeted for addition to the set of media formats supported by the MFS 10, the server downloads and stores the appropriate data in the database on the MFS 10. As another alternative, media players standards and codecs are loaded directly onto the MFS database by a network or site administrator. As yet another alternative, the MFS 10 performs an update or adds new data to its database when the MFS 10 encounters a request from a user device 5 for a support of a new or upgraded media format. As a further alternative, other entities can contact the MFS 10 directly and provide the MFS 10 with the updates, such as an entity that maintains media player standards or codecs.

For example, a user can choose completely automatic updates of the universal media player to occur for example, at start-up of an application or in the background at scheduled or random intervals. The automatic updates can be performed with or without the user giving consent to the update through a prompt. The updating and initializing of communications can therefore be personalized to the user, whereby some users may choose not to initiate any communication unless initiated by the user device 5 and not the MFS 10. The user could also choose to update only when the user device 5 encounters a new media format, or an upgraded version of a supported media format.

IV. Updating Media Format Access Data

A method 50 of providing an update to a user device 5 will now be described with reference to FIG. 4. The method 50 begins with the initiation of a communication between the system 10 and the user device 5. For the purposes of this description, the system 10 will be referred to as the MFS and the user device 5 will be referred to as the universal media player. As mentioned above, this communication can occur in a multitude of ways, with either the MFS 10 or the universal media player device 5 being the initiator. The communication can be initiated for various reasons as well, such as at a scheduled time, random time, or in response to an event, such as due to encountering a new media type file or media format.

Figure 4:
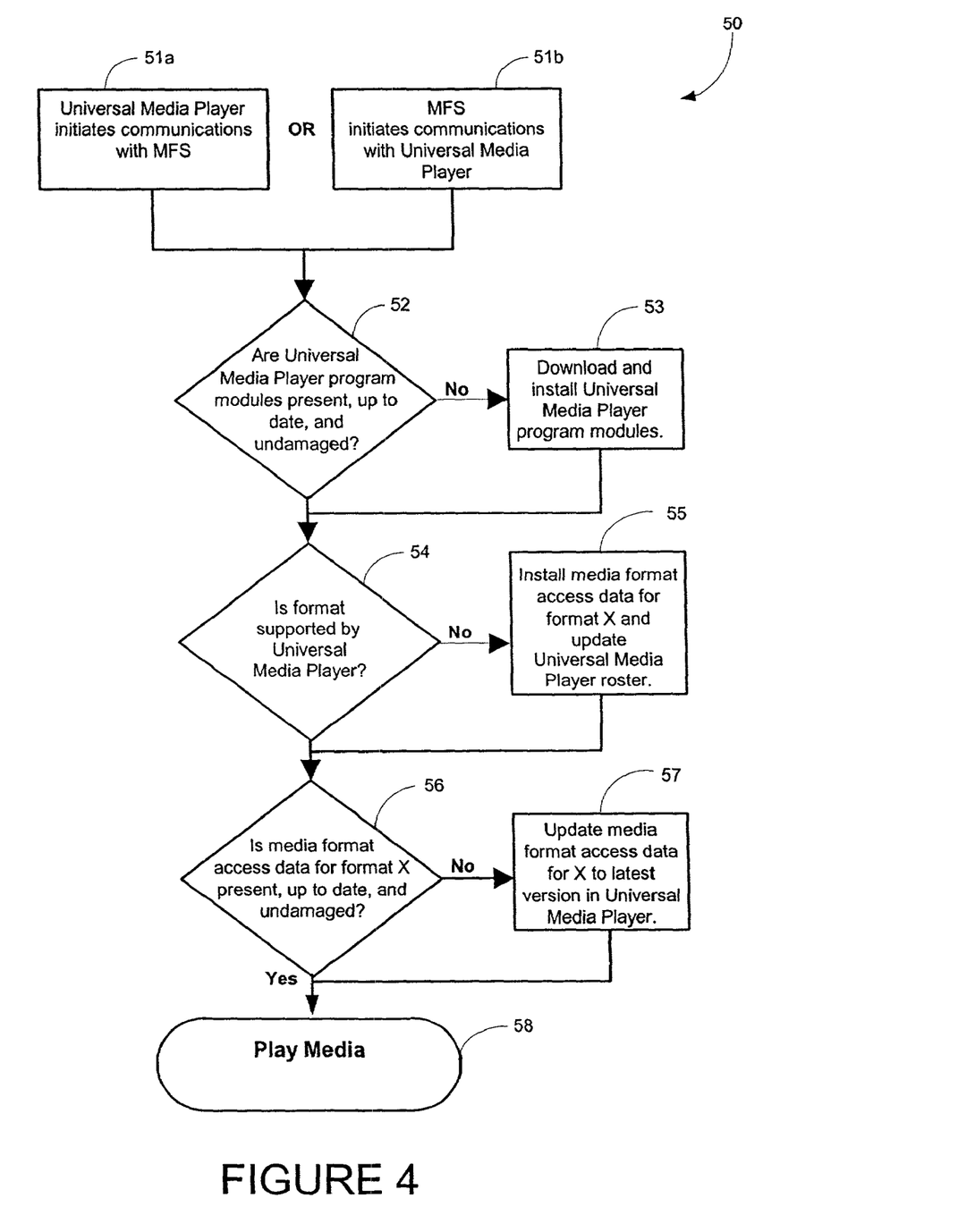
FIG. 4 is an exemplary screen shot of an interface according to an embodiment of the invention.

In the examples shown in FIG. 4, the universal media player can initiate communication with the MFS 10 at 51a or the MFS 10 can initiate communication with the universal media player at 51b. The MFS 10 can remotely initiate a communications session with the universal media player 5 and then control the comparison and transmission of codecs and media player standards. For example, the MFS 10 uses standard communications protocols to connect to a universal media player 5.

Next, at 52, the MFS 10 determines whether the universal media player is up-to-date. If not, then the MFS 10 at 53 downloads and installs updates. The MFS 10 can therefore automatically update the universal media player itself, although the MFS can update media format access data without performing 52 and 53.

At 54, the MFS 10 determines whether the codecs and media player standards installed in the universal media player are up-to-date. The MFS 10 compares the formats supported according to the MFS database to the media formats that are supported according to the roster in the user device's 5 local storage area. Any codecs and media player standards associated with media formats that are supported according to the MFS database but that do not exist on the roster are downloaded and installed on the user device's local storage area at 55. If a codec or media player standard exists both on the MFS 10 and on the user's local storage area, but the MFS 10 version is newer than the user's version, then the newest version is downloaded and installed on the user's local storage area at 57. If a codec or media player standard exists both on the MFS 10 and on the user's local storage area, but the user's version is damaged, then the newest version of that codec or media player standard is downloaded from the MFS 10 and installed on the user's local storage area at 57.

As mentioned above at 52 and 53, the MFS 10 can control program module updates of the universal media player application itself. Updates to the universal media player application will similarly be made available upon user demand, or via remotely initiated communications sessions.

Preferably, the same server within the MFS 10 maintains personalization information regarding each user's preferences, and distributes data according to the personalization information. For example, a user specifies a particular "look and feel" or "skin" to be applied to that user's version of the user interface 7 of the universal media player. The user may select the appearance and functionality of the universal media player through a variety of explicit or implicit means, including menu selections, radio buttons or other iconic controls, and the like. This personalization information is then transmitted to the server in the MFS 10. The server provides subsequent program module updates that maintain the look and feel of the user interface while updating program modules and data. Personalization information can include user preferences regarding types and organization of content. User preferences can be dynamically determined and amended according to past activity.

V. Universal Media Player

The universal media player according to a preferred embodiment of the invention is a client-side component comprised of a set of program modules and a user interface. The server-side component interfaces with the client-side component at the MFS 10 through a "virtual" appliance. The virtual appliance is displayed on a monitor or other display device of the user's personal computer, personal digital assistant (PDA), or other device. The virtual appliance can be considered a "universal media player" because the virtual appliance provides the user with a media player that can interface with almost any kind of file.

Figure 5:
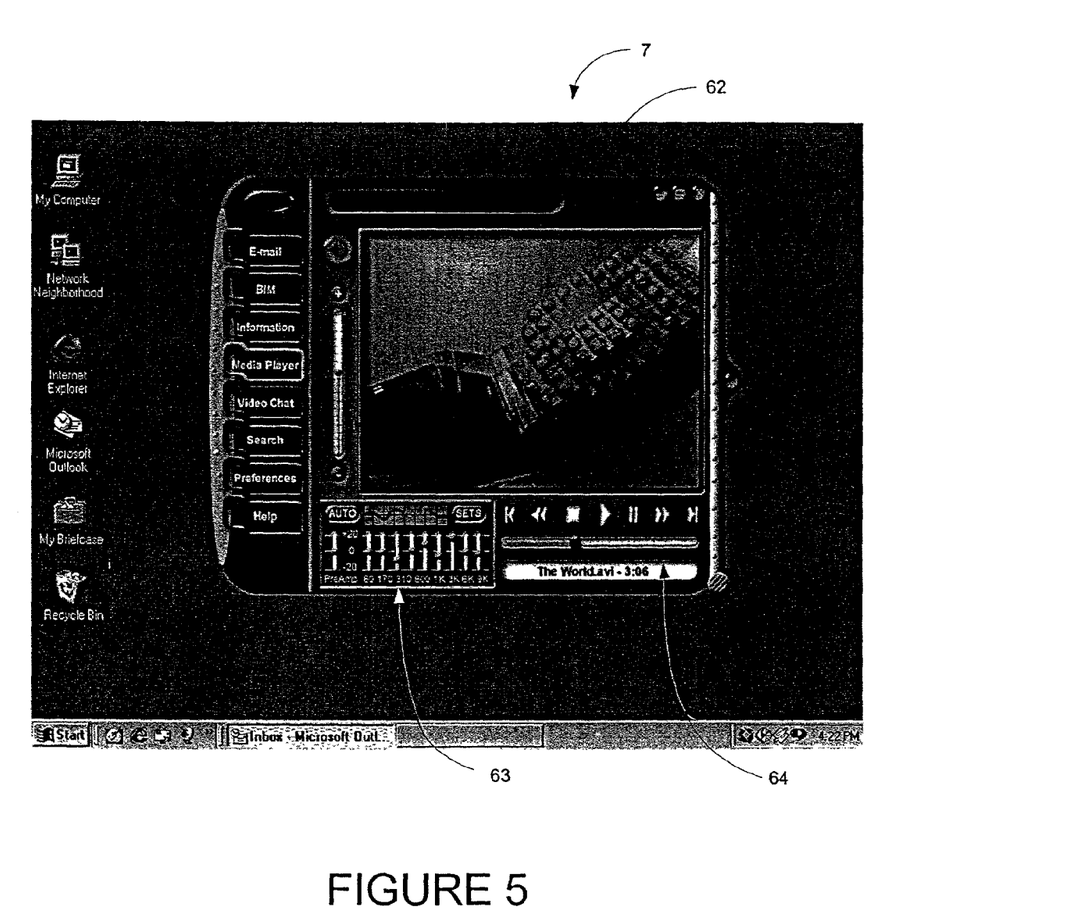
FIG. 5 is a flow chart of a method according to an embodiment of the invention.

An example of a interface 7 for the PC 5 is shown in FIG. 5. The interface 7 is an exemplary embodiment of a graphics-based user interface (GUI) 7 of the universal media player. The GUI 7 incorporates visual controls such as icons, pull-down menus, list boxes, pushbuttons, a cursor, and a mouse. Examples of common GUIs are Windows, Macintosh, and Motif. In a client/server environment, the GUI 7 resides in the user device 5.

In the exemplary embodiment shown in FIG. 5, the GUI 7 of the universal media player is generally rectangular. The GUI 7 can be displayed "full-screen," and can function while reduced to some fraction of available screen area, or while completely minimized or "icon-sized." When completely minimized, the universal media player can be "always on top," i.e., visible in a very small portion of the screen regardless of which other application the user activates.

The universal media player can be activated by the user, can be programmed to automatically start up when the computer is booted up, or can start up whenever a media file is encountered. For example, a user browses the Internet and encounters a website that contains links to audio and/or video files, such as television news content. If the user clicks on a link to access one of the media files, the universal media player automatically begins to run if the universal media player has not already been activated. Transparently to the user, the universal media player determines the appropriate media format to access the content and display and/or plays the content accordingly.

The GUI 7 of the universal media player includes a screen 62 having a viewing area that displays the visual content of media files. The screen 62 is suitable for viewing data, image, video and other visual file formats. The screen 62 of the universal media player can be sized by the user by clicking and dragging, or by accessing options.

The universal media player can be accompanied by a graphic equalizer 63, which enables the user to view and adjust the characteristics of the audio components of image or video files. The graphic equalizer 63 includes visual indication of audio input levels, and allows the user to control several sound modes, such as bass, treble, balance, fade, amplification. The user can preset the graphic equalizer 63 controls to output sound according to the user's preferences, and can alter the settings during a given listening session. The graphic equalizer 63 controls can include sliding buttons that can be moved using the computer's mouse or with keyboard commands.

When the user accesses a file that contains audio but no visual component, the screen 62 of the universal media player can become invisible, leaving only the other portions of the GUI 7, including the graphic equalizer 63 and user control. Alternatively, the screen of the universal media player can remain visible during the playing of an audio file, but can display a visual interpretation of the sound content of the audio file. For example, while playing a music file, the screen of the universal media player can display on object that reacts to the rhythm of the music.

The GUI 7 includes various other controls. For example, the GUI 7 includes a subset of controls 64 that enable the user to direct the dissemination of the content by issuing such commands as "stop," "play," "pause," "mute," "forward," "rewind," "go to the beginning," "go to the end," "go to the previous track," and "go to the next track." The GUI 7 can also utilize a system of user-accessible GUI controls that consists of devices such as a menu bar, buttons, data entry fields, clickable images, and any combination thereof. The user may also choose to access a specific time interval by using a sliding control, or by entering the time coordinates of the interval.

Another subset of controls on the GUI 7 allows the user to store, sort, and access a playlist of media content. To illustrate, as the user encounters media files and utilizes the universal medial player to access the content, the user will have the option of adding each new media file to the user's playlist, and can select the position of the new file relative to existing files in the playlist. Each entry in the playlist can contain information about the media file, including a title, file size, file type, length of time required to access the content of file, genre, and date, as well as custom fields as specified and populated by the user.

An exemplary embodiment of the inventions also includes a "roster" of supported media formats, which can include information regarding the version of associated codecs and media player formats and respective dates of previous updates. This feature permits a user to track media formats to determine which media formats are supported by the universal media player, and whether each media format has been received any updated media format access data from the MFS 10. The roster can be accessible to the user in the form of a list box or similar control.

The user interface controls the storage and display of the list of supported media formats and associated codecs and media player standards. FIG. 4 indicates how an exemplary embodiment of the universal media player will obtain codec and media players standards files associated with media formats from the MFS 10 to integrate them into the roster of media formats supported by the universal media player. In one embodiment, this process of retrieving codecs and media format standards will occur automatically when the user initially installs the universal media player. Thereafter, the universal media player will periodically obtain files necessary to support additional formats either as the files become available, or at scheduled intervals. The process of file retrieval can be initiated either by the universal media player, or by the MFS. Returning to the example where the provider hosting the MFS 10 is the user's ISP, the ISP can remotely initiate a session to add support for media formats to the user's universal media player. The invention is particularly useful in that when the user encounters media formats that were previously unsupported by the user's version of the universal media player, the universal media player can automatically retrieve the appropriate media format access data.

The user interface can also set preferences to control the updating of codecs and media player standards associated with media formats, such as through the "Preferences" button on the GUI 7. FIG. 5 indicates how in an exemplary embodiment, the universal media player will initiate the access of files to update the universal media player with new versions. This process can also occur automatically as updated files become available, or at scheduled intervals. Alternatively, FIG. 4 indicates that the provider can remotely initiate a session to update the version of media formats. The options can be set by the user through the "Preferences" button.

The universal media player comprises a software application, i.e., a set of program modules. The universal media player uses standard communications protocols to connect to the MFS via the server, in order to access, acquire, and install new or updated media formats and program modules. Examples of communications protocols include V.35, Ethernet, IPX, NetBEUI, NetBIOS, ASN. 1, and HTTP. The universal media player compares the codecs, media player standards, and program modules available on the MFS to the codecs, media player standards, and program modules that are stored on the user's local storage area, typically a hard disk drive. Any codecs or media player standards that are found on the MFS, but that are not exist on the user's local storage area are downloaded and installed on the user's local storage area. If a codec or media player standard does exist both on the MFS and on the user's local storage area, but the MFS version is newer than the user's version, then the newest version of that codec or media player standard is downloaded and installed on the user's local storage area.

The universal media player preferably can be customized for the convenience of the user. The user can specify preferences regarding such attributes as appearance of the application, content storage and playback, media format procurement and version updating. For example, the user can designate that the application run on a specified portion of the screen, occupying a specified amount of desktop area, and with a customized set of controls. The user can preset characteristics of the presentation of audio and video content, such as contrast, brightness, bass, and treble. The user can also create a system of cataloging and retrieving media files stored in the playlist. The user can also specify preferred media formats for use with a media file type. The user can therefore select between compatible and possibly competitive players, such as RealPlayer, QuickTime, or Windows Media Player.

The user can select a level at which the user will be involved in the process of updating the universal media player with data associated with new media file formats. In one embodiment the update process is completely automatic, can occur in the background regardless of whether the universal media player is activated, and can be transparent to the user. For example, in response to the user clicking on a media file of a previously unsupported media format while browsing the Internet, the universal media player becomes in communication with the MFS 10. The MFS 10 provides an operable version of media format access data that corresponds to the media format of that media file. In another embodiment, the MFS initiates communications with the universal media player, and causes updates to occur automatically. In another embodiment, the user can specify that updates should only occur when the universal media player is activated by the user, or only after the user has been notified that an update is available and has assented. For example, when the user activates the universal media player, a dialog box informs the user that a new version of one of a media format is available. The user is then prompted to permit or reject the download of the new version of the codec or media player standard.

Figure 6:
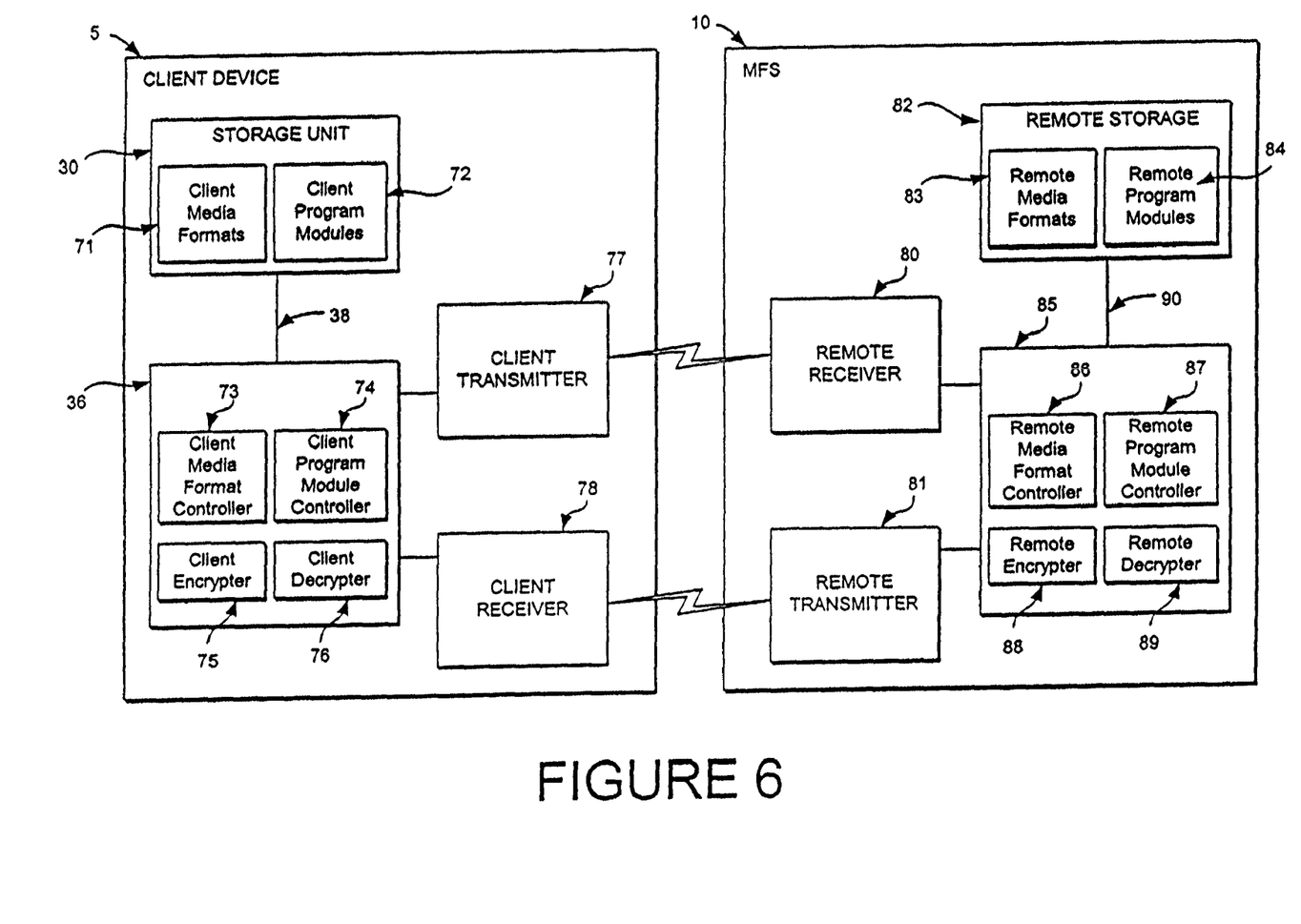
FIG. 6 is a block diagram of components of the universal media player and the media format site.

FIG. 6 shows the respective components of the user or client device 5 and the remote device (media format site) 10. The components of the client device 5 are interconnected by the bus 38. The client storage unit 30 stores client data including the list of supported media formats, which are stored in a set of client media formats 71, and program modules, which are stored in a set of client program modules 72. The client processor 36 executes client program modules, and utilizes codecs and/or media player standards associated with the client media formats to access the content of multimedia files. The client processor 36 includes a client media format controller 73 that controls updates of the set of client media formats 71 including the integration of new media formats received from the media format site 10, and deletion or replacement of obsolete or damaged codecs or media player standards. The client processor 36 also includes a client program module controller 74 that similarly updates the set of client program modules 72 by adding new program modules received from the media format site 10 or from another computer readable medium. Updates of client media formats or program modules can be triggered by various occurrences, such as launching the media player application, receiving data from the MFS 10, encountering a media file, or the passage of a predetermined amount of time. A client encrypter 75 encrypts data that is transmitted from the client device 5 by a client transmitter 77. A client decrypter 76 decrypts any encrypted data that is received by a client receiver 78. The client transmitter 77 sends data to a remote receiver 80 and receives data from a remote transmitter 81. The remote device 10 includes a remote storage unit 82 that stores remote data including codecs or media player standards, which are stored with a set of remote media formats 83, and program modules, which are stored with a set of client program modules 84. The remote storage unit 82 can store data in databases as well as in other storage architectures. A remote processor 85 includes a remote media format controller 86 that controls updates of media format access data needed to access the content of members of the set of remote media formats 83, including the addition of new codecs or media player standards received from multiple information sources such as from internet servers hosted by media format providers such as Real Player™ or from sources of non-proprietary media player standards. The remote media format controller 86 also controls deletion or replacement of obsolete or damaged codecs or media player standards that are stored with the set of remote media formats 83. Updates of codecs and media player standards associated with remote media formats can be triggered by various occurrences, such as initiating an inquiry to an information source, receiving data from an information source, or the passage of a predetermined amount of time. A remote program module controller 87 similarly controls updates the set of remote program modules 84 by adding new program modules that have been newly developed or acquired by the host of the media format site, and by deleting or replacing program modules that are obsolete or damaged. Updates of remote program modules are typically triggered manually by a programmer installing newly developed code, but other triggers can be implemented. A remote encrypter 88 encrypts data that is transmitted from the MFS 10 by the remote transmitter 81. A remote decrypter 89 decrypts any encrypted data that is received by the remote receiver 80. The components of the remote device 10 are interconnected by a bus 90.

The foregoing description of the preferred embodiments of the invention has been presented only for the purpose of illustration and description and is not intended to be exhaustive or to limit the invention to the precise forms disclosed. Many modifications and variations are possible in light of the above teaching. For example, the universal media player does not have to be rectangular; rather, any shape that provides sufficient viewing area and access to controls can be used. In addition, the universal media player can generate rather than procure media formats.

The embodiments were chosen and described in order to explain the principles of the invention and their practical application so as to enable others skilled in the art to utilize the invention and various embodiments and with various modifications as are suited to the particular use contemplated.

What is claimed is:

1. A system for accessing the content of various types of media files using a single interface, comprising:
   a client receiver for receiving remote data from a remote device, where the remote data includes remote program modules and remote media format access data that corresponds to a set of remote media formats, wherein the client receiver initiates communication with the remote device;
   a client storage unit for storing client data, the client data further comprising:
      a roster of client media formats that are accessible by the system;
      a set of client media format access data; and
      a set of client program modules;
      wherein received remote media format access data is stored as client media format access data, and received remote program modules are stored as client program modules;
   a client transmitter for transmitting client data to the remote device, wherein client data sent by the transmitter to the remote device includes status information that indicates the status of the client data;
   a client processor for executing any of the set of client program modules and for using the client media format access data to access the content of media files, wherein the set of client media format access data comprises at least one codec shared by more than one of the remote media formats and wherein the at least one codec is used to access the content of the media files without previously associating the client media formats with the client program modules; and
   a client media format controller for updating the set of client media access data by automatically accessing a plurality of remote devices each of which supports fewer than all the client media access formats supported by the client media format controller so as to add remote media format access data received from the plural remote devices, for replacing client media format access data with corresponding remote media format access data received from the plural remote devices when the existing stored client media access format data is damaged and for deleting client media format access data.

2. The system of claim 1, wherein the client receiver is for receiving remote data from a remote device when the system encounters a media file that has a media format that is not present in the roster of client media formats, and where the remote data includes remote media format access data that enables the system to access the content of the encountered media file.

3. The system of claim 1, wherein client data transmitted to the remote device includes identifying data and billing information.

4. The system of claim 1, further comprising:
a decrypter for decrypting the remote data; and
an encrypter for encrypting the client data prior to transferring the client data to the remote device.

5. The system of claim 1, further comprising a client program module controller for updating the set of client program modules by adding remote program modules received from the remote device, for replacing client program modules with corresponding remote program modules received from the remote device, and for deleting client program modules.

6. The system of claim 1, wherein the client media format controller updates the set of client media formats and associated client media format access data upon receiving an inquiry from at least one remote device.

7. The system of claim 6, wherein the client program module controller updates the set of client program modules upon receiving an inquiry from the remote device.

8. The system of claim 1, further comprising a network interface for interfacing with the Internet.

9. The system of claim 1, further comprising a graphical user interface (GUI), the GUI further comprising:
means for selecting media files to be accessed by the system;
means for controlling the appearance of the GUI, wherein the GUI is customizable such that a user can determine how the GUI is displayed; and
means for controlling the functionality of the GUI, wherein the GUI is customizable such that a user can determine the frequency and manner of data transfers to and from the remote device;
wherein user custom izations are stored in the client storage unit as personalization data.

10. The system of claim 9, wherein the processor accesses the content of media files according to the stored personalization data.

11. The system of claim 9, wherein the GUI displays a roster of the set of client media formats in a user-readable format.

12. The system of claim 11, wherein the roster includes the status of the client data.

13. The system of claim 9, wherein the GUI further comprises a graphic equalizer.

14. The system of claim 9, wherein the GUI further comprises a viewing area.

15. The system of claim 9, wherein the client transmitter transmits the stored personalization data to the remote device and the remote device stores the personalization data in a remote storage unit.

16. The system of claim 1, wherein the client media format controller replaces client media format access data when corresponding remote media format access data is received from the remote device.

17. The system of claim 16, wherein the client media format controller replaces client media format access data if the corresponding remote media format access data is a newer version.

18. The system of claim 5, wherein the client program module controller replaces a client program module according the personalization data.

19. The system of claim 5, wherein the client program module controller replaces a client program module when a corresponding remote program module is received from the remote device.

20. The system of claim 19, wherein the client program module controller replaces a client program module if the corresponding remote program module is a newer version.

21. The system of claim 19, wherein the client program module controller replaces a client program module if the client program module is damaged.

22. A system for maintaining and distributing media formats, comprising:
a remote media format controller for compiling remote media format access data usable for accessing the content of a set of remote media formats when the existing stored remote media access data is damaged, and for updating the remote media format access data by accessing a plurality of remote devices each of which supports fewer than all the remote media formats of the set of remote media formats, wherein the remote media format controller initiates communication with the plurality of remote devices;
a remote program module controller for compiling and updating a set of remote program modules;
a remote storage unit for storing the remote media format access data and the set of remote program modules;
a remote encrypter for encrypting the remote media format access data and the remote program modules; and
a remote transmitter for transmitting remote media format access data and remote program modules to at least one client device that is connected to the communications network;
wherein the set of remote media formats includes at least one commercially available media format wherein the set of remote media format access data comprises at least one codec and wherein the at least one codec shared by more than one of the remote media formats and is used to access the content of media files without previously associating the remote media formats with the remote program modules.

23. The system of claim 22, further comprising:
a remote receiver for receiving client data from the client device; and
a remote decrypter for decrypting the client data.

24. The system of claim 23, wherein the remote receiver is for uploading billing and user identification data from the client device.

25. The system of claim 23, wherein the remote receiver is for uploading data indicating the status of client media format access data stored on the client device and wherein the remote transmitter is for downloading the remote media format access data to the client device according to the uploaded status data.

26. The system of claim 23, wherein the remote receiver is for uploading data indicating the status of client program modules stored on the client device and wherein the remote transmitter is for downloading the remote program modules to the client device according to the uploaded status data.

27. The system of claim 23, wherein the remote receiver is for uploading user personalization data, and the remote transmitter is for downloading remote media format access data and remote program modules according the user personalization data.

28. The system of claim 27, wherein the personalization data further controls the frequency and manner of downloading and storage of the remote program modules, and the personalization data controls the links to the media files.

29. The system of claim 28, wherein the remote storage unit further functions to store the personalization data.

30. A method of displaying content of media files, comprising:
- storing a set of client program modules and a set of client media format access data on a client device;
- connecting the client device to a communications network;
- comparing the set of client media format access data to a set of remote media format access data;
- downloading members of a set of remote media format access data when the media format comparison indicates that existing stored remote media format access data is damaged;
- storing the members of the set of remote media format access data in the set of client media format access data on the client device;
- accessing the content of the media files using the client media format access data, wherein the set of client media format access data comprises at least one codec and wherein the at least one codec is used to access the content of the media files without previously associating client media formats with the client program modules; and
- downloading members of the set of remote media format access data from a plurality of remote devices each of which supports fewer than all the remote media format access data according to the personalization data, wherein downloading members of the set of remote media format access data from a plurality of remote devices comprises the client program modules initiating communication with the plurality of remote devices.

31. The method of claim 30, further comprising:
- comparing a set of client program modules to a set of remote program modules;
- downloading members of a set of remote program modules in response to the program module comparison; and
- storing the members of the set of remote program modules in the set of client program modules on the client device.

32. The method of claim 30, further comprising decrypting the members of the set of remote media format access data.

33. The method of claim 30, further comprising decrypting the members of the set of remote program modules.

34. The method of claim 30, further comprising implementing customizations to the appearance and functionality of a graphical user interface (GUI) and storing the customizations as personalization data.

35. The method of claim 34, further comprising transmitting the personalization data to a remote device.

36. The method of claim 30, further comprising:
- implementing customizations to the appearance and functionality of the GUI and storing the customizations as personalization data; and
- downloading members of the set of remote program modules according to the personalization data.

37. The method of claim 30, further comprising transmitting data to a remote device.

38. The method of claim 30, further comprising transmitting billing and identifying data to the remote device.

39. The method of claim 37, wherein transmitting data further comprises encrypting the data.

40. The method of claim 30, wherein storing the members of the set of remote media format access data further comprises deleting corresponding members of the set of client media format access data previously stored on the client device.

41. The method of claim 31, wherein storing the members of the set of remote program modules further comprises deleting corresponding members of the set of client program modules previously stored on the client device.

42. A method of maintaining and distributing media format access data, comprising:
- a set of remote media format access data that is usable to access the content of at least one commercially available media format;
- storing the set of remote media format access data on a remote server;
- storing additional media format access data in the set of remote media formats by obtaining the additional media format access data from a plurality of remote devices each of which supports fewer than all the media format access data of the set of remote media format access data; and
- downloading media format access data to a client device when the existing media access data stored on the client device is damaged, wherein the media format access data comprises at least one codec shared by more than one of the remote media formats and wherein the at least one codec is used to access the content of the at least one commercially available media format without previously associating the at least one commercially available media format with a program module running on the client device, wherein downloading media format access data to a client device comprises the client device initiating communications with the plurality of remote devices to download media format access data.

43. The method of claim 42, wherein obtaining the additional media format access data further comprises retrieving media format access data that have no corresponding members in the set of remote media format access data.

44. The method of claim 42, wherein obtaining the additional media format access data further comprises retrieving media format access data that are newer than the corresponding members of the set of remote media format access data.

45. The method of claim 42, further comprising uploading status data from the client device, where the status data indicates the status of a set of client media format access data, and wherein downloading data to the client device further comprises downloading data to the client device according to the status data.

46. The method of claim 42, wherein downloading data comprises transmitting the data over the Internet.

47. The method of claim 42, further comprising uploading billing and identifying data from the client device.

48. The method of claim 45, wherein uploading status data further comprises uploading a result of a comparison of the set of remote media format access data to the set of client media format access data.

49. The method of claim 45, further comprising:
- compiling a set of remote program modules;
- storing the set of remote program modules on the remote server; and
- storing additional remote program modules on the remote server by adding program modules that have no corresponding members in the set of remote program modules;
- downloading program modules from the set of remote program modules to the client device according to the status data;
- wherein the status data further indicates the status of a set of client program modules.

50. The method of claim 49, wherein the status data further includes user personalization data.

51. The method of claim 49, further comprising encrypting data downloaded from the remote server.

52. The method of claim 49, further comprising decrypting data uploaded to the remote server.

53. The method of claim 42, wherein downloading data to the client device is initiated by the remote server.

54. The method of claim 42, wherein downloading data to the client device is initiated by the client device.

55. A machine readable medium having stored thereon executable code which causes a machine to perform a method of displaying content of media files, the method comprising:
storing a set of client program modules and a set of client media format access data on a client device;
connecting the client device to a communications network;
comparing the set of client media format access data to a set of remote media format access data;
downloading members of a set of remote media format access data from a plurality of remote devices each of which supports fewer than all member of the set of remote media format access data, when the media format comparison indicates that existing stored remote media format access data is damaged, wherein downloading member of a set of remote media format access data comprises the client device initiating communication with the plurality of remote devices;
storing the members of the set of remote media format access data in the set of client media format access data on the client device; and
accessing the content of the media files using the client media format access data, wherein the set of client media format access data comprises at least one codec shared by more than one of the media files and wherein the at least one codec is used to access the content of the media files without previously associating client media formats with the client program modules.

56. The machine readable medium of claim 55, wherein the method further comprises:
comparing a set of client program modules to a set of remote program modules;
downloading members of a set of remote program modules in response to the program module comparison; and
storing the members of the set of remote program modules in the set of client program modules on the client device.

57. The machine readable medium of claim 55, wherein the method further comprises decrypting the members of the set of remote media format access data.

58. The machine readable medium of claim 55, wherein the method further comprises decrypting the members of the set of remote program modules.

59. The machine readable medium of claim 55, wherein the method further comprises implementing customizations to the appearance and functionality of a graphical user interface (GUI) and storing the customizations as personalization data.

60. The machine readable medium of claim 55, wherein the method further comprises transmitting the personalization data to a remote device.

61. The machine readable medium of claim 55, wherein the method further comprises downloading members of the set of remote media format access data according to the personalization data.

62. The machine readable medium of claim 55, wherein the method further comprises:
implementing customizations to the appearance and functionality of the GUI and storing the customizations as personalization data; and
downloading members of the set of remote program modules according to the personalization data.

63. The machine readable medium of claim 55, wherein the method further comprises transmitting data to the remote device.

64. The machine readable medium of claim 55, wherein the method further comprises transmitting billing and identifying data to the remote device.

65. The machine readable medium of claim 63, wherein transmitting data further comprises encrypting the data.

66. The machine readable medium of claim 55, wherein storing the members of the set of remote media format access data further comprises deleting corresponding members of the set of client media format access data previously stored on the client device; and wherein storing the members of the set of remote program modules further comprises deleting corresponding members of the set of client program modules previously stored on the client device.

67. A machine readable medium having stored thereon executable code which causes a machine to perform a method for maintaining and distributing media format access data, the method comprising:
compiling a set of remote media format access data that is usable to access the content of at least one commercially available media format;
storing the set of remote media format access data on a remote server;
storing additional media format access data in the set of remote media formats by obtaining the additional media format access data from a plurality of remote devices each of which supports fewer than all members of the set of remote media format access data; and
downloading media format access data to a client device when the existing media access data stored on the client device is damaged, wherein the media format access data comprises at least one codec and wherein the at least one codec is used to access the content of the at least one commercially available media format without previously associating the at least one commercially available media format with a program module running on the client device, wherein downloading media format access data comprises the client device initiating communication with the plurality of remote devices.

68. The machine readable medium of claim 67, wherein obtaining the additional media format access data further comprises retrieving media format access data that have no corresponding members in the set of remote media format access data.

69. The machine readable medium of claim 67, wherein obtaining the additional media format access data further comprises retrieving media format access data that are newer than the corresponding members of the set of remote media format access data.

70. The machine readable medium of claim 67, wherein the method further comprises uploading status data from the client device, where the status data indicates the status of a set of client media format access data, and wherein downloading data to the client device further comprises downloading data to the client device according to the status data.

71. The machine readable medium of claim 67, wherein downloading data comprises transmitting the data over the Internet.

72. The machine readable medium of claim 67, wherein the method further comprises uploading billing and identifying data from the client device.

73. The machine readable medium of claim 70, wherein uploading status data further comprises uploading a result of a comparison of the set of remote media format access data to the set of client media format access data.

74. The machine readable medium of claim 67, wherein the method further comprises:
compiling a set of remote program modules;

storing the set of remote program modules on the remote server; and storing additional remote program modules on the remote server by adding program modules that have no corresponding members in the set of remote program modules;

downloading program modules from the set of remote program modules to the client device according to the status data;

wherein the status data further indicates the status of a set of client program modules.

75. The machine readable medium of claim 74, wherein the status data further includes user personalization data.

76. The machine readable medium of claim 74, wherein the method further comprises encrypting data downloaded from the remote server.

77. The machine readable medium of claim 74, wherein the method further comprises decrypting data uploaded to the remote server.

78. The machine readable medium of claim 67, wherein downloading data to the client device is initiated by the remote server.

79. The machine readable medium of claim 67, wherein downloading data to the client device is initiated by the client device.

80. The system of claim 1, further comprising a graphical user interface (GUI), wherein when the GUI accesses at least one of the remote media formats that contains at least one audio component and no visual component, the GUI having a screen configured to become invisible, leaving only a user control visible.

* * * * *